United States Patent
Joern et al.

(10) Patent No.: US 8,100,162 B2
(45) Date of Patent: Jan. 24, 2012

(54) GUIDING DEVICE FOR A DEVICE FOR PRODUCING FIBER PREFORMS BY THE TFP PROCESS FOR COMPOSITE COMPONENTS

(75) Inventors: Paul Joern, Hamburg (DE); Ulrich Eberth, Rain (DE)

(73) Assignee: Airbus Deutschland GmbH, Hamburg (DE)

( * ) Notice: Subject to any disclaimer, the term of this patent is extended or adjusted under 35 U.S.C. 154(b) by 667 days.

(21) Appl. No.: 11/988,972

(22) PCT Filed: Jul. 24, 2006

(86) PCT No.: PCT/EP2006/064580
§ 371 (c)(1),
(2), (4) Date: Jan. 8, 2009

(87) PCT Pub. No.: WO2007/010054
PCT Pub. Date: Jan. 25, 2007

(65) Prior Publication Data
US 2009/0178765 A1 Jul. 16, 2009

(30) Foreign Application Priority Data

Jul. 22, 2005 (DE) .......................... 10 2005 034 403

(51) Int. Cl.
- B29C 65/56 (2006.01)
- B29C 65/62 (2006.01)
- B32B 37/00 (2006.01)
- B32B 39/00 (2006.01)
- B32B 43/00 (2006.01)

(52) U.S. Cl. ............. 156/391; 156/538; 156/91; 156/93

(58) Field of Classification Search ................... 156/71, 156/91, 93, 390, 391, 441, 500, 538; 118/200, 118/202, 205, 208, 209, 210
See application file for complete search history.

(56) References Cited

U.S. PATENT DOCUMENTS
4,135,459 A * 1/1979 Manabe et al. ............ 112/102.5
(Continued)

FOREIGN PATENT DOCUMENTS
DE 19836854 A1 * 2/2000
(Continued)

OTHER PUBLICATIONS
English Abstract of JP 61-072513A (2011).*
(Continued)

*Primary Examiner* — Sing P Chan
(74) *Attorney, Agent, or Firm* — Greer, Burns & Crain, Ltd.

(57) ABSTRACT

A guiding device for a device for producing fibre preforms by the TFP process, the guiding device guiding the fibre strand. The guiding device has an opening with a variable cross-section for leading through the fibre strand, wherein the guiding device is fitted in the region of a sewing head of the TFP process device. The width of the fibre strands to be laid and attached can be increased, for example in portions of the path curve with small radii of curvature, so that undesired local thickenings are avoided in these portions of the path curve. An open-loop and closed-loop control device undertakes the path control of the sewing head and the control of the variation of the cross-sectional geometry of the guiding device. Existing devices for producing fibre preforms for composite components by the TFP process can be retrofitted with the guiding device.

13 Claims, 1 Drawing Sheet

U.S. PATENT DOCUMENTS

Figure 1:
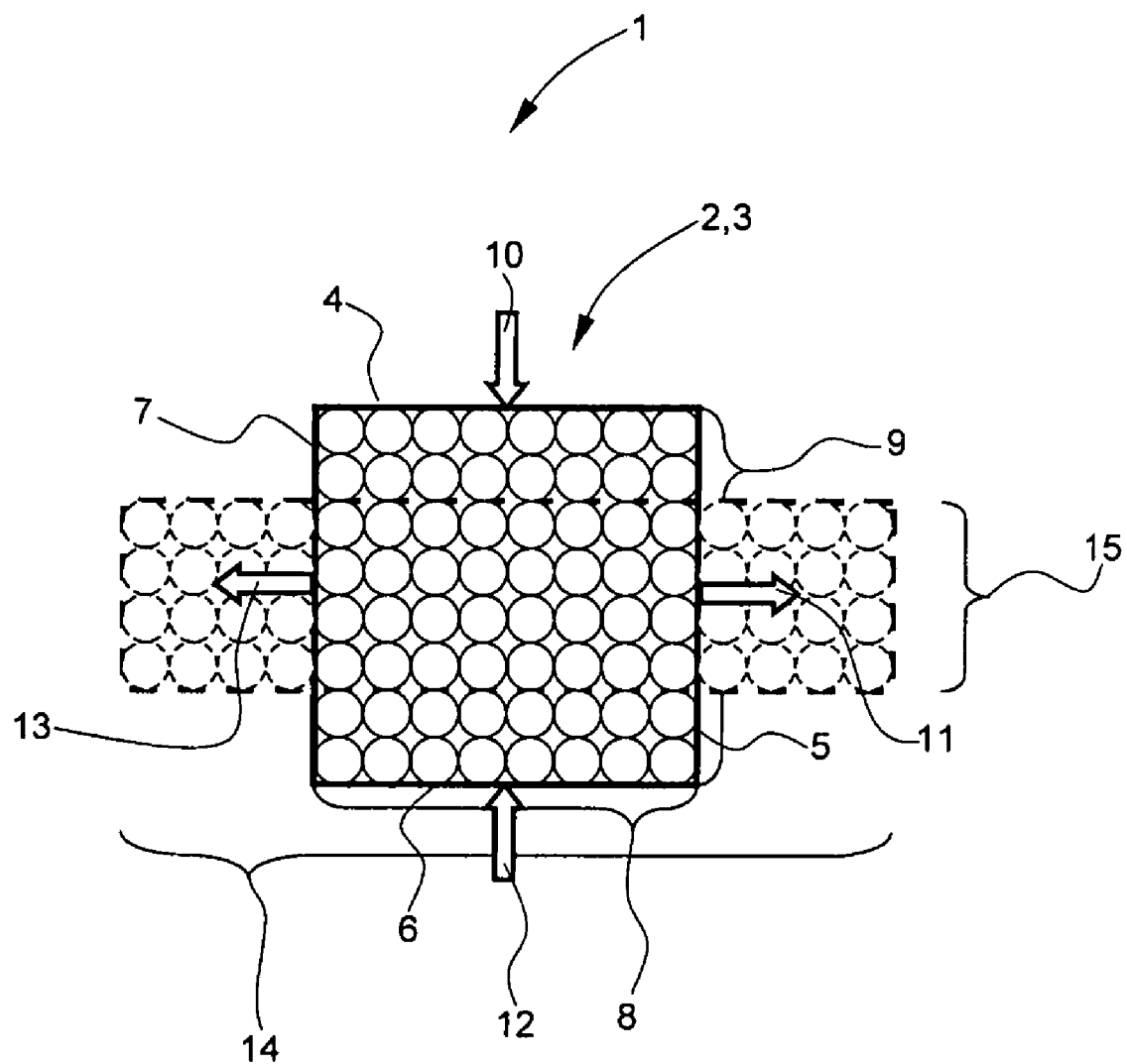

| | | | |
|---|---|---|---|
| 4,778,367 A * | 10/1988 | Hilakos | 425/113 |
| 2004/0074589 A1* | 4/2004 | Gessler et al. | 156/155 |
| 2009/0151860 A1* | 6/2009 | Carter et al. | 156/148 |

FOREIGN PATENT DOCUMENTS

| | | |
|---|---|---|
| DE | 101 23 064 A1 | 11/2002 |
| DE | 103 01 646 A1 | 7/2004 |
| GB | 2 041 489 A | 9/1980 |
| JP | 61072513 A * | 4/1986 |
| JP | 63297019 A * | 12/1988 |
| JP | 6-210751 | 8/1994 |

OTHER PUBLICATIONS

English Abstract of JP 63-297019A (2011).*

Englsih Abstract of DE 19836854A1 (2011).*

* cited by examiner

GUIDING DEVICE FOR A DEVICE FOR PRODUCING FIBER PREFORMS BY THE TFP PROCESS FOR COMPOSITE COMPONENTS

The invention relates to a guiding device for a device for producing fibre preforms by the TFP process ("Tailored Fibre Placement") for composite components by laying and attaching a fibre strand on a backing layer with virtually any desired path curve, the guiding device serving substantially for guiding the fibre strand.

In lightweight construction, in particular in aircraft construction and in aerospace, fibre-reinforced composite components, which have a high weight-saving potential on account of their high strength with at the same time low mass, are increasingly being used for load-bearing structural components.

The alignment of the reinforcing fibres in the finished composite component has a decisive influence on the achievable rigidity and strength. The reinforcing fibres should, as far as possible, follow the direction of loading, not have any wave formations and be subjected to uniform loading.

With conventional semifinished products, such as, for example, woven or laid fibre fabrics, not all conceivable fibre orientations can be realized, since the reinforcing fibres are always fixed there in a specific orientation. So there are, for example, individual cases in some conventional semifinished products where all the orientations of reinforcing fibres between 0° and 360° are each represented with an approximately equal probability, so that only composite components that are substantially exposed to the same mechanical loads in all spatial directions—"quasi isotropically"—can be effectively reinforced with them.

In the case of a circular disc that is subjected to torsional loading, however, the path followed by the force follows specific involutes, which consequently indicate the optimum path for the fibres. In this case, for example, it is required that the reinforcing fibres are laid in an area-covering manner and alternating at angles of +45° and −45°, wherein the component thickness at the inner edge should be greater than at the outer edge, since the highest loads occur there. These fibre orientations consequently cannot be formed with conventional mats or woven fabrics of reinforcing fibres.

One possible way of complying with a requirement for a layer of fibres in accordance with loading is the so-called TFP process ("Tailored Fibre Placement"). This involves the laying of at least one fibre strand along any desired path curve and fixing of it on a backing layer with the aid of an attaching thread, whereby the position and orientation of the individual reinforcing fibres in a fibre preform that is formed in this way can be adapted in a virtually ideal way to the flux of force prevailing in the later composite component. The fibre strand or strands to be laid ("rovings") are formed here by a multiplicity of individual reinforcing fibres running parallel to one another ("filaments"). The individual reinforcing fibres may be formed, for example, by glass fibres, carbon fibres, aramid fibres or the like.

The fibre strand is laid as flat as possible, to achieve a high packing density in the fibre preform. The minimum layer thickness to be laid is restricted by the thickness of the fibre strand. The thickness of the fibre preform or of the finished component can be set by way of the number of laid layers with fibre strands. The maximum number of layers to be arranged one on top of the other is limited here substantially by the length of the needle used in the TFP process. The feeding of the fibre strands is performed by means of a guiding device ("lever") substantially tangentially in relation to the path curve and in relation to the backing layer on which the fibre preform is built up by laying the fibre strands in a number of layers.

The production of the fibre preforms from fibre strands in the TFP process is performed with known devices, in particular with modern, computer-controlled automatic sewing and embroidering machines. Devices of this type for carrying out the TFP process generally have a sewing head, which can be freely positioned in two spatial dimensions under computer control. Furthermore, the guiding device for the fibre strand to be laid is arranged in the region of the sewing head. Once all the required layers of fibre strands have been laid, the finished fibre preform is cut out from the backing layer and impregnated with a curable polymer material and cured, for example by means of the known RTM process ("Resin Transfer Moulding"), to form a finished composite component. Epoxy resins, polyester resins or the like are used, for example, as the curable polymer material.

A disadvantage of the known devices for carrying out the TFP process is that the guiding device used for laying the fibre strand on the backing layer has a through-opening with an invariable cross-sectional geometry. As a result, the fibre strand, which has a generally approximately rectangular cross-sectional geometry, can only ever be laid with the same cross-sectional geometry, that is to say with a constant width or height. It follows from this that under some circumstances the thickness of the component is not quite uniform over the entire surface area of the fibre preform due to undesired local deviations in the material thickness of the fibre preform. For example, such thickenings of the component may occur in the region of relatively small laying radii of the fibre strand, since the height of the fibre strand is increased when laying with small radii.

DE 101 23 064 A1 discloses a method for producing a three-dimensional TFP preform with a fibre alignment that is, with preference, in accordance with the flux of force.

In the course of the method known from document E1, a reinforcing fibre laid in a multiplicity of loops, or a reinforcing fibre strand ("roving"), is tufted (attached) by means of a sewing thread on the surface of a block of foam material to form the TFP preform. After the fixing of the TFP preform by means of a binder, the TFP preform is pulled off from the block of foam material and impregnated with a curable polymer material for the production of a finished composite component. It is of disadvantage in the case of this method that the reinforcing fibre strand is always laid with the same width, which leads to undesired fluctuations in thickness, in particular in the case of small laying radii.

JP 6-210 751 A does disclose a device for the variable cross-sectional changing of a reinforcing fibre strand, wherein the reinforcing fibre strand is already preimpregnated with a curable polymer material (so-called "prepreg" material). To be able to change the cross-sectional geometry of the reinforcing fibre strand, the reinforcing fibre strand is passed through a guiding frame with a quadrangular cross-sectional geometry, the inner wall surfaces of which are respectively formed by a circulating conveyor belt. Attachment of the preimpregnated reinforcing fibre strand in the guiding frame is prevented by the conveyor belts. At least three of the total of four conveyor belts are formed such that they are displaceable transversely in relation to a longitudinal axis of the reinforcing fibre strand, so that the cross-sectional geometry of the reinforcing fibre strand can be varied. Arranged upstream of the guiding frame are a height regulating means and a width regulating means for the guidance of the reinforcing fibre strand. A disadvantage in the case of this refinement is its complex construction with a number of conveyor belts for the guiding and forming of the fibre reinforcing strand by changing the cross-sectional geometry, with the running belts also being formed such that they are displaceable perpendicularly in relation to a longitudinal axis of the reinforcing fibre strand, making it difficult for the device known from JP 6-210 751 A to be arranged directly at a sewing head used for the TFP process.

The object of the invention is to avoid the disadvantages described above of the known embodiments of guiding device for devices for carrying out the TFP process and to provide a guiding device which allows variation of the cross-sectional geometry of the reinforcing fibre strand and, moreover, is suitable on account of a simplified construction for arrangement in the region of a sewing head used for the TFP process.

This object is achieved by a guiding device with the characterizing features of Patent claim 1.

The fact that the guiding device has a through-opening with a variable cross-sectional geometry for leading through the fibre strand, wherein the guiding device can be fitted in the region of a sewing head of the device for carrying out the TFP process, allows, for example, a width of the fibre strand that is to be laid to be varied in dependence on the radius of curvature of the path curve at any given time.

A further advantageous refinement of the guiding device according to the invention provides that the through-opening is formed such that it is curved, in particular in an elliptical, oval or circular manner, at least in certain portions.

As a result, jamming of the fibre strand within the sleeve-like through-opening formed in this way is largely avoided.

In accordance with an advantageous refinement of the guiding device according to the invention, the through-opening is formed in a substantially quadrangular manner.

As a result, the variation of the cross-sectional geometry of the through-opening can be constructionally realized relatively easily.

A further advantageous refinement of the guiding device provides that a width and/or a height of the through-opening is variable.

It is possible by means of this refinement to vary the cross-sectional geometry of the through-opening, for example, just by changing the width of the through-opening.

According to a further advantageous embodiment of the guiding device, it is provided that, in portions of a path curve with small radii of curvature, the width of the through-opening can be increased and/or the height of the through-opening can be reduced, in order to avoid undesired thickenings of the fibre preform in these portions of the path curve.

This has the overall result of a more uniform distribution of the material thickness of the fibre preform, which corresponds substantially to a preset value for the material thickness in virtually all regions of the path curve.

Further advantageous refinements of the arrangement are presented in the further patent claims.

IN THE DRAWING

FIG. 1 shows a representation of the guiding device.

FIG. 1 shows a schematic representation of a first variant of the guiding device 1 according to the invention, which represents part of a device that is not represented for carrying out the TFP process.

The device for carrying out the TFP process has a sewing head, which can be freely positioned in preferably two spatial dimensions by means of an open-loop and closed-loop control device. The guiding device 1 according to the invention for guiding the fibre strand to be laid on the backing layer is preferably arranged in the region of the sewing head or directly at the sewing head. Under the control of the open-loop and closed-loop control device, the fibre strand can be laid in virtually any desired path curves on the backing layer and attached by fixing threads by means of the sewing head, so that fibre preforms with an orientation of the reinforcing fibres that is substantially in accordance with the flux of force can be formed. The spatial position of the fibre strands is secured here by attachment with fixing fibres on the backing layer, so that the fibre preform can be taken out from the device for carrying out the TFP process and, for example by placement in a closable mould and subsequent impregnation or saturation with a curable polymer material, can be cured to form a finished composite component. The impregnating and subsequent curing with the curable polymer material or a resin system that can be cured by crosslinking, in particular an epoxy resin, a polyester resin, a BMI resin or the like, may be performed, for example, by means of the known RTM process ("Resin Moulding Transfer").

The guiding device 1 has a through-opening 2 for guiding and passing through a fibre strand 1. The through-opening 2 is formed here by the longitudinal sides 4 to 7. The fibre strand 3 is formed by a multiplicity of individual reinforcing fibres, which are not provided with reference numerals for a better overview of the drawing, but are indicated by circles. The longitudinal axes of the individual reinforcing fibres run perpendicularly here in relation to the plane of the drawing. The reinforcing fibres may be built up, for example, by carbon fibres, glass fibres, aramid fibres or the like. In the position of the guiding device 1 that is represented by the solid black line, the longitudinal sides 4 to 7 form a through-opening 2 with a square cross-sectional geometry. In a corresponding way, a width 8 and a height 9 of the guiding device 1 are in this state substantially the same.

The reinforcing fibres of a fibre strand 3 fill the through-opening 2 virtually completely and are guided by the longitudinal sides 4 to 7. The fibre strand 3 must not lie too firmly against the longitudinal sides 4 to 7 here, in order to avoid jamming within the guiding device 1.

In this first position, the fibre strand 3 is laid with the greatest possible thickness, that is to say approximately with the height 9, on the backing layer. If the sewing head moves, for example in a portion of a path curve that has a smaller radius of curvature, it is desirable to reduce the heights 9 to be laid of the fibre strands 3, or increase the width, in order to prevent undesired thickenings in this region. Furthermore, other influencing factors are conceivable, for example the ambient temperature, the speed at which the fibre strand 3 runs through or the like, in respect of which it appears advisable to reduce the height 9 of the guiding device 1, and consequently the thickness of the fibre strand.

For this purpose, the longitudinal sides 4 to 7 are moved in the direction of the arrows 10 to 13 into a second position, represented by a dashed line, by means of adjusting means not represented any more specifically. As a result, the width 8 increases to a width 14 and the height 9 is reduced to the height 15, the area content of the rectangle that is defined by the longitudinal sides 4 to 7 preferably remaining approximately unchanged however, so that always approximately the same number of reinforcing fibres can be passed through the guiding device 1. The first and second positions of the guiding device, symbolized by the solid line and the dashed line, merely represent end positions. A large number of intermediate positions are possible between the first position and the second position. Furthermore, it is not necessary for the width 8 and the height 9 of the guiding device 1 to be changed simultaneously. It is also possible to have only adjustability of the width 8 in the direction of the arrows 11, 13 or only adjustability of the height 9 of the guiding device 1 in the direction of the arrows 10, 12.

It is also evident in this connection from the representation of FIG. 1 that the cross-sectional area of the through-opening 2 is substantially constant, since the number of circles in the first position of the guiding device 1 (square through-opening) that is represented by the solid line is equal to the number of circles in the second position of the guiding device 1 (rectangular through-opening) that is represented by the dashed line.

Furthermore, it is not necessary for the reinforcing fibres of the fibre strand 3 to be enclosed by the longitudinal sides 4 to 7 on all sides. Rather, it may be provided that there is an empty space between the fibre strand 3 and the longitudinal side 4. This reduces the possibility of the fibre strands 3 or individual reinforcing fibres (filaments) that form the fibre strands 3 becoming jammed in the through-opening 2 of the guiding device 1, in particular in the corner regions of the quadrangle defined by the longitudinal sides 4 to 7.

The adjusting means may act mechanically, electrically, pneumatically, hydraulically, thermally or in some other way. The movement of the adjusting means in the direction of the arrows 10 to 13 is controlled here by an open-loop and closed-loop control device that is not represented. The open-loop and closed-loop control device, for example in the form of a known CNC controller, preferably controls at the same time the position of the sewing head in at least two spatial dimensions, that is to say for example in the xy plane. This refinement has the advantage that a small radius of curvature of the path curve can be determined by the open-loop and closed-loop control device without delay on the basis of the path coordinates of the path curve of the sewing head at any given time, so that the adaptation of the cross-sectional geometry of the through-opening 2 is instigated by the longitudinal sides 4 to 7 being moved correspondingly by means of the adjusting means.

The adjusting means may be formed, for example, as electromotively driven gear spindles or the like, the path of movement of which can be controlled by means of the open-loop and closed-loop control device. Guiding device 1 is formed here with preference in such a way that it can be easily attached or exchanged by means of standardized connecting elements in the region of a sewing head or directly at a sewing head of a device for carrying out the TFP process.

In a second variant of the guiding device that is not shown, the through-opening may be curved, at least in certain portions. In this case, the through-opening has, for example, a circular, elliptical or overall cross-sectional geometry. This refinement provides the advantage in particular that the fibre strand 3 running through cannot become jammed in the corner regions of an angular through-opening in accordance with the first variant (cf. FIG. 1). To provide a guiding device with a curved through-opening or a guiding sleeve of this type, it is possible, for example, to connect both ends of a strip of elastic material to each other, so as to obtain a guiding device or a guiding sleeve with a cross-sectional geometry that is substantially annular in the basic state. Metal strips, plastic strips or the like come into consideration, for example, as strips of elastic material. Alternatively, an elastic round material may also be used.

Acting on the outer surface area of the strip of material are, for example, four adjusting means, which are respectively arranged offset by 90° and by means of which the cross-sectional geometry of the through-opening formed in this way, which is substantially annular in the basic state—that is to say in the relaxed state—can be varied by moving the adjusting means, controlled by the open-loop and closed-loop control device. If, for example, the upper adjusting means and the lower adjusting means press the strip of elastic material together, while the adjusting means arranged on the left side and the right side at the same time pull the strip of material apart, it is possible, for example, to create a through-opening with an elliptical cross-sectional geometry, the width of which is greater than its height.

Alternatively, instead of the external adjusting means, it is possible to lend the strip of material itself actuatory capabilities, at least in certain regions. For example, piezoelectric actuators, actuators with "memory metal" or the like may be applied to the outer surface area of the strip of material. If the strip of material is formed, for example, by a metal strip, the memory metals may also be integrated directly in the metal strip to form the actuators, that is to say the metal strip is formed with "memory metals" of its own, at least in certain portions. This refinement has the advantage of a very compact structural form and, in addition, allows very quick and largely delay-free variation of the cross sectional geometry of the through-opening.

LIST OF REFERENCE NUMERALS

1 guiding device
2 through-opening
3 fibre strand
4 longitudinal side
5 longitudinal side
6 longitudinal side
7 longitudinal side
8 width
9 height
10 arrow
11 arrow
12 arrow
13 arrow
14 width
15 height

The invention claimed is:

1. A device for producing fiber preforms by a TFP process for composite components by laying and attaching a fiber strand on a backing layer with virtually any desired path curve, the device comprising:
   a sewing head for attaching the fiber strand to the backing layer by fixing threads and
   a guiding device being fitted in a region of the sewing head and serving for guiding the fiber strand onto the backing layer, the guiding device having a through-opening with a variable cross-sectional geometry for leading through the fiber strand.

2. The device according to claim 1, wherein the through-opening is curved at least in certain portions.

3. The device according to claim 2, wherein the through-opening is curved in an elliptical, oval or circular manner, at least in certain portions.

4. The device according to claim 1, wherein the through-opening is formed such that it is substantially quadrangular.

5. The device according to claim 1, wherein at least one of a width and a height of the through-opening is variable.

6. The device according to claim 1, wherein, in portions of a path curve with small radii of curvature, a width of the through-opening can be increased or a height of the through-opening can be reduced, in order to avoid undesired thickenings of the fiber preform in these portions of the path curve.

7. The device according to claim 1, wherein, in portions of a path curve with great radii of curvature, a width of the through-opening can be reduced or a height of the through-opening can be increased, in order to achieve a specific material thickness of the fiber preform more quickly in these portions of the path curve.

8. The device according to claim 1, wherein the cross-sectional geometry of the through-opening can be varied by adjusting means.

9. The device according to claim 1, wherein, at least one of a height and a width of the through-opening can be varied by adjusting means.

10. The device according to claim 9, wherein the adjusting means can be controlled by an open-loop and closed-loop control device.

11. The device according to claim 10, wherein the adjusting means can be controlled in dependence on a radius of curvature of a portion of a path curve at any given time.

12. The device according to claim 1, wherein a position of the sewing head for attaching the fiber strand on the backing layer can be controlled in at least two spatial dimensions by means of an open-loop and closed-loop control device.

13. The device according to claim 1, wherein a cross-sectional area of the through-opening is substantially constant, irrespective of its width or height.

* * * * *